US006426770B1

(12) United States Patent
Hosokawa

(10) Patent No.: US 6,426,770 B1
(45) Date of Patent: Jul. 30, 2002

(54) APPARATUS FOR INSPECTING FACE PLATE FOR COLOR CRT

(75) Inventor: Yoshinori Hosokawa, Kyoto (JP)

(73) Assignee: Horiba, Ltd., Kyoto (JP)

( * ) Notice: Subject to any disclaimer, the term of this patent is extended or adjusted under 35 U.S.C. 154(b) by 0 days.

(21) Appl. No.: 09/473,124

(22) Filed: Dec. 28, 1999

(30) Foreign Application Priority Data

Apr. 9, 1999 (JP) .......................................... 11-103155

(51) Int. Cl.[7] .................................................. H04N 7/18
(52) U.S. Cl. .......................................... 348/93; 348/190
(58) Field of Search ........................... 348/131, 86, 92, 348/93, 125, 187, 189, 191, 190; 382/321

(56) References Cited

U.S. PATENT DOCUMENTS 3,579,252 A * 5/1971 Goodman .................. 178/7.85
5,729,640 A * 3/1998 Castonguay ................ 382/327

* cited by examiner

*Primary Examiner*—Victor R. Kostak
(74) *Attorney, Agent, or Firm*—Sughrue Mion, PLLC

(57) ABSTRACT

A vacuum box, having a pair of soft X-ray windows for passing a soft X-ray generated by a soft X-ray source therethrough, is disposed in front of the soft X-ray source. A face plate for a color CRT is disposed at a rear side of the vacuum box. A color camera is arranged so as to observe a light emitting sate of an RGB phosphor screen of the face plate for the color CRT at a time where the soft X-ray generated from the soft X-ray source is irradiated on the face plate for the color CRT through the vacuum box. An image processing unit analyzes a color picture obtained from the color camera.

5 Claims, 4 Drawing Sheets

45
35

20
21
28
35
42
43

45
35
35
44

46

APPARATUS FOR INSPECTING FACE PLATE FOR COLOR CRT

BACKGROUND OF THE INVENTION

The present invention relates to an apparatus for inspecting the light-emitting state of an RGB (red, green, blue) phosphor screen of a face plate of a color CRT (cathode ray tube).

FIG. 3 shows a generally know color CRT. In the figure, a reference numeral 1 depicts a color CRT. The color CRT is formed by an electron gun section 6 and a face plate 7. In the electron gun section 6, a tube 2 made of lead glass, barium glass or the like, contains three (or one) electronic guns 3, a focusing electrode 4, a convergence electrode 5 or the like. The face plate 7 is combined with the entirely opened side of the electron gun section 6 by means of a welding process or the like thereby to form an airtight vacuum space together with the tube 2. As the same as the tube 2, the face plate 7 is made of lead glass, barium glass or the like. The face plate is formed by a front glass plane 8, an RGB phosphor screen 9 on which phosphor dots of R, G, B are disposed in a mosaic fashion, and a shadow mask 10 or the like. A metal back layer 11 formed by an aluminum film with a thickness in a range of about $5\times10^{-4}$ to $5\times10^{-6}$ cm, for example, is formed at the rear surface side of the RGB phosphor screen 9. In FIG. 3, reference numerals 12 and 13 depict deflection yoke and a color purity adjusting coil disposed in the vicinity of the outer portion of the tube 2.

The face plate 7 of the aforesaid color CRT 1 may be damaged during the manufacturing process thereof in such a manner that the aluminum enters into the RGB phosphor screen 9. Thus, it is required to inspect the face plate. However, conventionally, as shown in FIG. 4, the face plate is inspected in a state where the face plate 7 is combined with the electron gun section 6 and so the face plate is incorporated within the color CRT 1 operable as a completed color CRT.

To be more concrete, as shown in FIG. 4, the face plate 7 is combined with the electron gun section 6 and the inner portion thereof is placed in a vacuum state thereby to complete the color CRT 1, then suitable driving voltages are supplied to the respective portions of the electron gun section 6, and the light emitting sate of the R, G, B phosphor dots on the RGB phosphor screen 9 at the time where an electron beam 14 is irradiated on the RGB phosphor screen 9 is observed by a color CCD (charge-coupled device) camera 15. The output of the color CCD camera 15 is subjected to the image processing by a computer 16 having an image processing function to inspect whether or not there is a defect on the RGB phosphor screen 9. In FIG. 4, a reference numeral 17 depicts a corn-shaped hood for shielding the external light from being incident therein.

However, according to the aforesaid conventional method of inspecting the face plate for the color CRT, the inspection is not performed as to the face plate 7 itself in a state separated from other parts but the inspection is performed in a state where the face plate is incorporated within the completed color CRT 1. Thus, at the time of the inspection, it is required to perform the operations for combining the electron gun section 6 with the face plate 7 and for exhausting air within the tube so as to place the inner portion thereof in a vacuum state after the combining operation. Further, when it is determined that there is a damage at the face plate 7 as the result of the inspection, it is required to detach the face plate 7 from the electron gun section 6 and, at the time of the detaching, the electron gun section 6 having no defect portion may be damaged. In this manner, there arise problems that the inspection efficiency and the productivity are not good.

SUMMARY OF THE INVENTION

The present invention has been attained in view of the aforesaid conventional problems.

An object of the present invention is to provide an apparatus for inspecting a face plate for a color CRT (hereinafter referred to inspection apparatus for a face plate) which can efficiently inspect the face plate itself in a state separated from other parts without joining the face plate with an electron gun section.

In order to attain the aforesaid object, an apparatus for inspecting a face plate for a color CRT according to the present invention includes: a soft X-ray source for generating a soft X-ray; a vacuum box disposed in front of the soft X-ray source and having a pair of soft X-ray windows for passing the soft X-ray generated by the soft X-ray source therethrough; the face plate for the color CRT disposed at a rear side of the vacuum box; a color camera for observing a light emitting sate of an RGB phosphor screen of the face plate for the color CRT at a time where the soft X-ray generated from the soft X-ray source is irradiated on the face plate for the color CRT through the vacuum box; and an image processing unit for analyzing a color picture obtained from the color camera.

In the inspection apparatus for a face plate according to the present invention, the inspection of the face plate can be performed by using only the face plate itself in a state separated from other parts without combining the face plate to be inspected with the electron gun section. Thus, unlike the conventional inspection method, since the present invention does not require the combining procedure nor the exhausting and vacuum forming procedure for each face plate, the inspection efficiency can be improved and the productivity of color CRTs can also be improved.

DETAILED DESCRIPTION OF THE PREFERRED EMBODIMENT OF THE INVENTION

Figure 1:
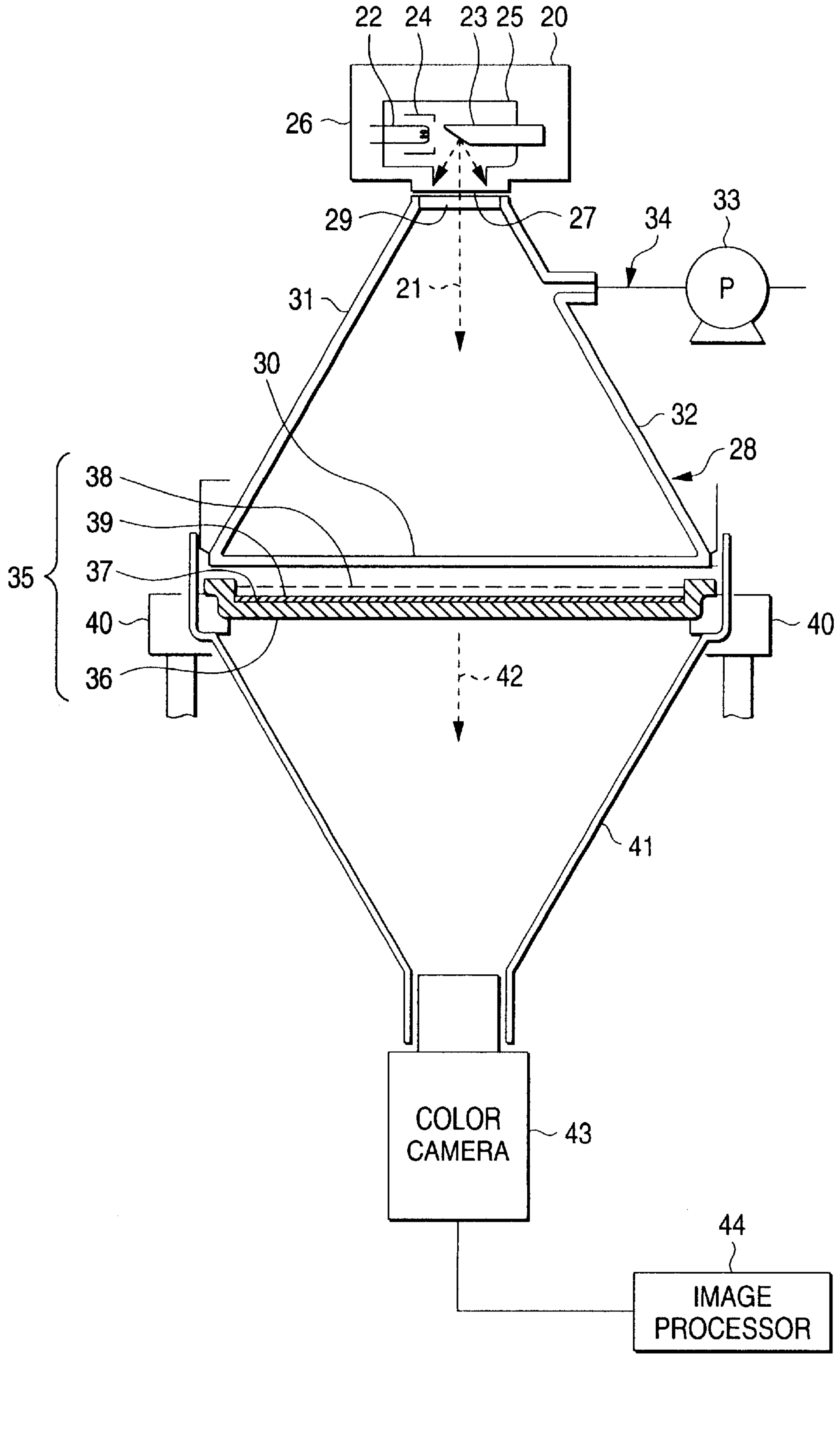
FIG. 1 is a schematic diagram showing an inspection apparatus for a face plate according to an embodiment of the present invention.

An inspection apparatus for a face plate according to an embodiment of the present invention will be explained with reference to the accompanying drawings. FIG. 1 and FIGS. 2A to 2D show the embodiment of the present invention. FIG. 1 is a schematic diagram showing the arrangement of the inspection apparatus for a face plate according to the embodiment of the present invention. In FIG. 1, a reference numeral 20 depicts a soft X-ray source for dispersedly generating a soft X-ray 21. The soft X-ray source is constituted in a manner that an X-ray tube 25 formed by a hot cathode 22, an anticathode 23, a Wehnelt cylinder 24 or the like is provided within a casing 26. Further, the soft X-ray source is arranged in a manner that, when the hot cathode 22 is applied with the voltage, an electron beam generated from the hot cathode 22 is focused on the surface of the anticathode 23 by means of the Wehnelt cylinder 24 to generate the soft X-ray 21 and then to emit the soft X-ray 21 out of a soft X-ray window 27 provided on the front face side of the soft X-ray source.

A reference numeral 28 depicts a vacuum box for conducting the soft X-ray 21 dispersedly generated by the soft X-ray source 20 to the entire surface of an RGB phosphor screen 37 of a face plate 35 described later. The vacuum box is formed in its cross sectional view in an isosceles triangle shape or an equilateral triangle shape, for example, so that the cross sectional shape thereof becomes broader toward the bottom side from the apex portion. To be more concrete, the vacuum box 28 is configured in a manner that soft X-ray windows 29, 30 formed by a metal thin film made of beryllium, aluminum or the like are provided at one apex portion opposing to the soft X-ray window 27 and the bottom side portion opposing to the apex portion, respectively, and other two side portions 31, 32 and other portions (upper surface portion and a bottom surface portion) are formed by coating X-ray shielding material such as lead or molybdenum on the outer surface of inner material such as aluminum, iron, glass or the like. The vacuum box is configured entirely in an airtight structure. An exhaust system 34 having a suction pump 33 is coupled to the vacuum box 28 so that the inner portion of the vacuum box is placed in a suitable vacuum state. The vacuum box 28 is preferably arranged in a manner that the soft X-ray window 29 is disposed as close as possible to the soft X-ray window 27 of the soft X-ray source 20 so that an air layer formed therebetween becomes as thin as possible.

Figure 3:
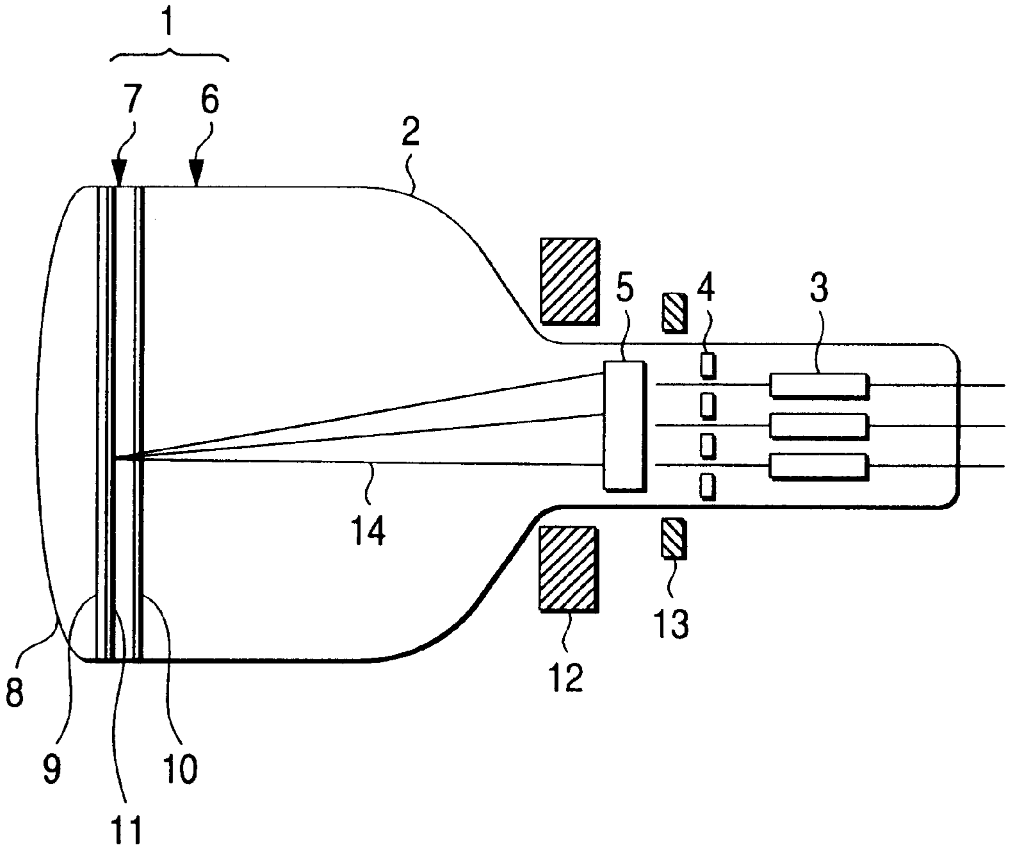
FIG. 3 is a longitudinal sectional diagram showing the general configuration of a color CRT.
Figure 4:
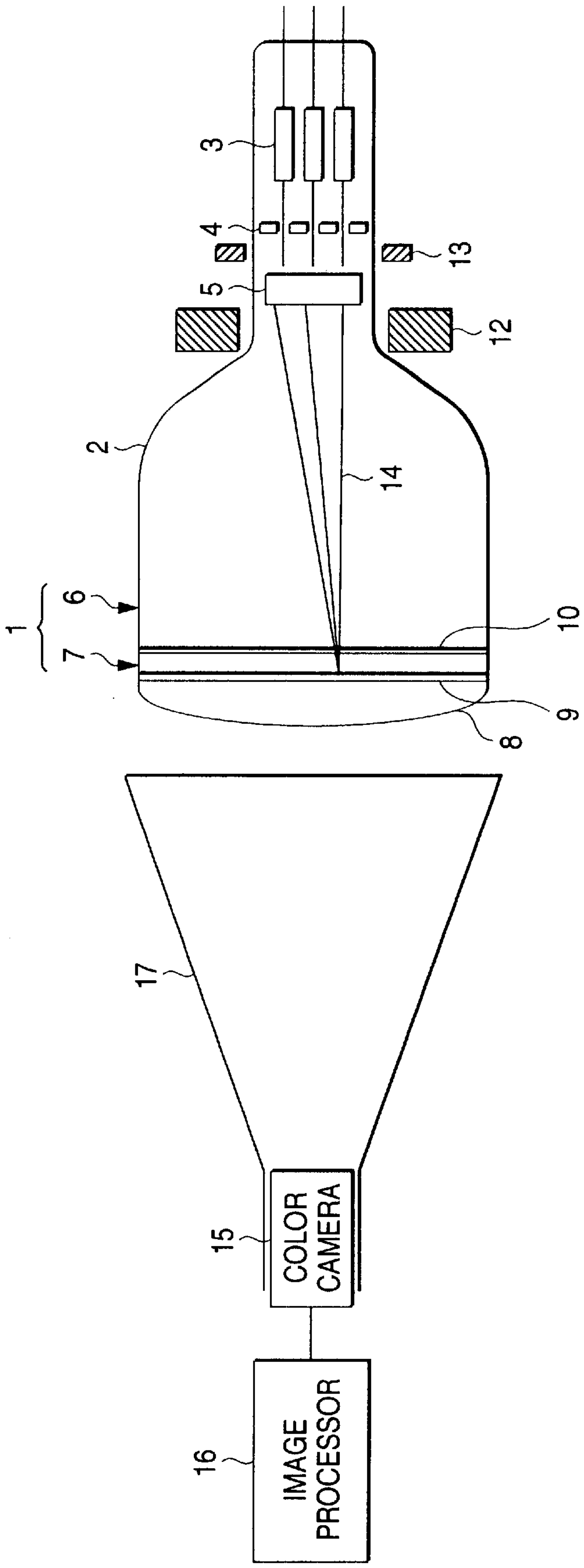
FIG. 4 is a diagram showing a conventional inspection apparatus for a face plate.

A reference numeral 35 depicts a face plate to be inspected, which is formed by a front glass plane 36, the RGB phosphor screen 37, a shadow mask 38 or the like. A metal back layer 39 is formed on the rear surface side of the RGB phosphor screen 37. The face plate in this embodiment is same as the face plate 7 shown in FIGS. 3 and 4. The face plate 35 is held by a suitable holding device 40 so as to be level in a state that the metal back layer 39 side thereof is directed toward the soft X-ray window 30.

A reference numeral 41 depicts a hood for shielding the external light so that the external light does not badly influence on a light 42 which is generated when the soft X-ray 21 is irradiated on the RGB phosphor screen 37. The hood is formed in an isosceles triangle shape or an equilateral triangle shape, for example, so that the cross sectional shape thereof becomes narrower toward the direction opposite to the glass plane 36 side of the face plate 35 and the spread portion of the hood is formed so as to shield the periphery of the glass plane 36 from the external light. The hood 41 is held by the holding device 40, for example.

A reference numeral 43 depicts a color camera, for example, a color CCD camera provided at the apex or narrowed portion of the hood 41. A reference numeral 44 depicts a device for subjecting the output of the color CCD camera 43 to the image processing, for example, a computer having an image processing function.

The method of inspecting the face plate 35 by using the thus configured inspection apparatus for a face plate will be explained with reference to FIGS. 2A to 2D. FIGS. 2A to 2D are schematic diagrams showing the inspection process of the face plate in the embodiment. A reference numeral 45 depicts an electron gun section which is same as the electron gun section 6 shown in FIGS. 3 and 4.

Figures 2A, 2B, 2C, 2D:
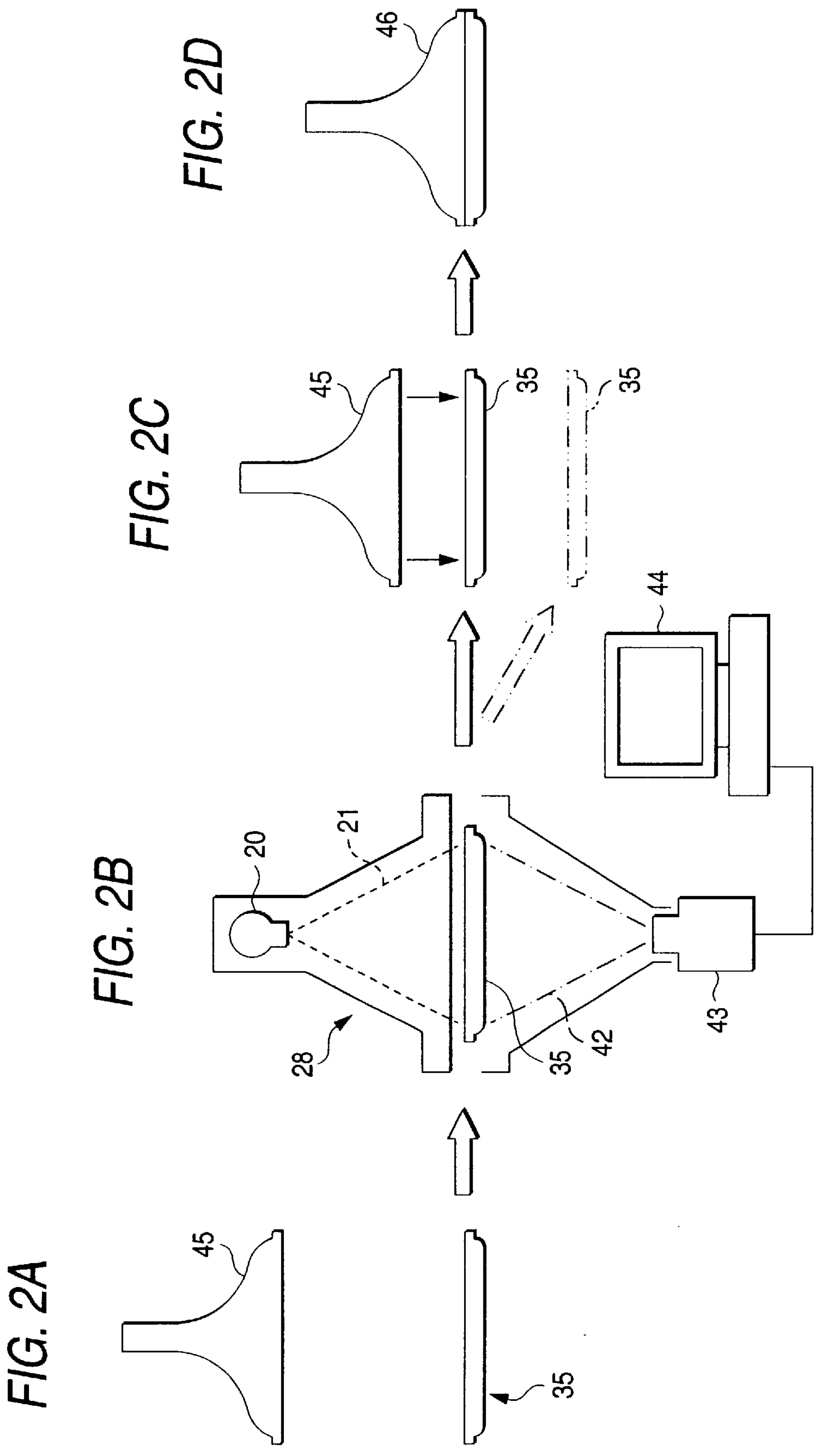
FIGS. 2A to 2D are schematic diagrams showing the inspection process of the face plate in the present invention.

As shown in FIG. 2A, the face plate 35 and the electron gun section 45 are separately assembled in different processes, respectively. The face plate 35 is provided with the glass plane 36, the RGB phosphor screen 37, the shadow mask 38 or the like. The metal back layer 39 is formed on the rear surface side of the RGB phosphor screen 37.

The thus configured face plate 35 is incorporated in the inspection apparatus as shown in FIG. 1. Then, the suction pump 33 is operated to keep the inner portion of the vacuum box 28 in a predetermined vacuum state. In this state, when the predetermined voltage is supplied to the soft X-ray source 20, the soft X-ray 21 is dispersedly generated and dispersed from the soft X-ray source 20 through the soft X-ray window 27 and then incident through the one soft X-ray window 29 into the vacuum box 28 whose bottom side is made broader. Since the inner portion of the vacuum box 28 is kept in the predetermined vacuum state, the soft X-ray 21 can proceed within the vacuum box 28 in a spread shape toward the bottom side without being absorbed by air or the like. Then, the soft X-ray 21 thus proceeded within the vacuum box 28 is irradiated on the RGB phosphor screen 37 of the face plate 35 through the other soft X-ray window 30 (refer to FIG. 2B).

According to the irradiation of the soft X-ray 21 onto the RGB phosphor screen 37, fluorescent light 42 is generated from the phosphor dots R, G, B and the light 42 is irradiated into the color CCD camera 43 through the hood 41 whose cross section becomes narrower toward the camera, whereby the fluorescent light from the phosphor dots R, G, B is observed by the camera (refer to FIG. 2B). The fluorescent light from the phosphor dots R, G, B thus observed is entered into the computer 44 as image information and such an inspection is made as to whether or not there is a damage on the RGB phosphor screen 37, like the prior art.

As the result of the inspection, if it is determined that there is no damage on the RGB phosphor screen 37, the face plate of the phosphor screen thus determined to have no damage is combined with the electron gun section 45 as shown by a steady line in FIG. 2C and then finishes a color CRT 46 as shown in FIG. 2D. In contrast, as the result of the inspection, if it is determined that there is a damage on the RGB phosphor screen 37, the face plate of the RGB phosphor screen 37 thus determined to be damaged is disposed as a defective part as shown by a phantom line in FIG. 2C.

As described above, in the inspection apparatus for a face plate according to the present invention, the soft X-ray 21 instead of an electron beam is irradiated on the RGB phosphor screen 37 of the face plate 35 which is formed by subjecting the metal back processing to the RGB phosphor screen 37. Thus, the inspection of the face plate can be performed by using only the face plate 35 in a state separated from other parts. In other word, unlike the conventional this kind of inspection apparatus for a face plate, the face plate 35 can be inspected easily since it is not required to combine the face plate 35 with the electron gun section 45 nor to exhaust the air and place in a vacuum state at the inner portion of the combined face plate and the electron gun section.

Further, in the inspection apparatus for a face plate according to the present invention, if it is determined as the result of the inspection that there is a damage on the RGB phosphor screen 37, it is required to dispose only the face plate 35 of the RGB phosphor screen 37 thus determined to be damaged as a defective part. Accordingly, unlike the conventional this kind of inspection apparatus for a face plate, since it is not required to perform such a processing for separating the face plate which has been once combined with the electron gun section, the number of procedures for processing a defective part can be largely reduced.

Furthermore, when a source for dispersedly generating and irradiating the soft X-ray 21 is employed as the soft X-ray source 20, it is convenient that the soft x-ray 21 can be irradiated on the RGB phosphor screen 37 of the face plate 35 without scanning the soft X-ray 21 to the two-dimensional direction.

In the aforesaid embodiment, the suction pump 33 is not required to be operated during the inspection of the face plate. That is, on and after when the vacuum box 28 is placed in a vacuum state, the so-called chip-off of the pump may be performed. Although the embodiment shown in FIG. 1 is arranged in a manner that the face plate 35 is held in level and the soft X-ray 21 is irradiated from the upper direction of the face plate onto the RGB phosphor screen 37, the present invention may be arranged in a manner that the face plate 35 is held vertically and the soft X-ray 21 is irradiated from the level direction onto the RGB phosphor screen 37.

As described above, in the inspection apparatus for a face plate according to the present invention, unlike the conventional this kind of inspection apparatus, the inspection of the face plate can be performed by using only the face plate itself in a state separated from other parts without using a completed color CRT which is formed by combining the face plate to be inspected with the electron gun section. Thus, unlike the conventional inspection method, since the present invention does not require the combining procedure nor the exhausting and vacuum forming procedure for each face plate, the inspection efficiency can be improved and the productivity of color CRTs can also be improved.

What is claimed is:

1. An apparatus for inspecting a face plate for a color CRT, comprising:

a soft X-ray source for generating a soft X-ray;

a vacuum box disposed in front of said soft X-ray source and having a pair of soft X-ray windows for passing the soft X-ray generated by said soft X-ray source therethrough;

said face plate for the color CRT disposed at a rear side of said vacuum box;

a color camera for observing a light emitting state of an RGB phosphor screen of said face plate for the color CRT at a time where the soft X-ray generated from said soft X-ray source is irradiated on said face plate for the color CRT through said vacuum box; and an image processing unit for analyzing a color picture obtained from said color camera.

2. An apparatus for inspecting a face plate for a color CRT as claimed in claim 1, wherein said vacuum box is formed in its cross sectional view in an isosceles triangle.

3. An apparatus for inspecting a face plate for a color CRT as claimed in claim 1, wherein said soft X-ray windows are formed by metal thin film which are provided at one apex portion opposing to said soft X-ray source and a bottom side portion opposing to said apex portion, respectively; and other side portions are formed by coating X-ray shielding on the outer surface of inner material.

4. An apparatus for inspecting a face plate for a color CRT as claimed in claim 1, further comprising a hood for shielding said face plate from the external light.

5. An apparatus for inspecting a face plate for a color CRT as claimed in claim 4, wherein said hood is formed in an isosceles triangle shape.

* * * * *